(12) United States Patent
Mori et al.

(10) Patent No.: US 11,192,743 B2
(45) Date of Patent: Dec. 7, 2021

(54) GLASS ROLL PRODUCTION METHOD

(71) Applicant: Nippon Electric Glass Co., Ltd., Shiga (JP)

(72) Inventors: Hiroki Mori, Shiga (JP); Yohei Kirihata, Shiga (JP); Koji Ishichi, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 376 days.

(21) Appl. No.: 16/482,770

(22) PCT Filed: Feb. 22, 2018

(86) PCT No.: PCT/JP2018/006490
§ 371 (c)(1),
(2) Date: Aug. 1, 2019

(87) PCT Pub. No.: WO2018/168382
PCT Pub. Date: Sep. 20, 2018

(65) Prior Publication Data
US 2019/0352115 A1 Nov. 21, 2019

(30) Foreign Application Priority Data
Mar. 14, 2017 (JP) .............................. JP2017-048486

(51) Int. Cl.
*B65H 18/08* (2006.01)
*B65H 23/188* (2006.01)
*C03B 33/023* (2006.01)

(52) U.S. Cl.
CPC ........... *B65H 18/08* (2013.01); *B65H 23/188* (2013.01); *C03B 33/0235* (2013.01)

(58) Field of Classification Search
None
See application file for complete search history.

(56) References Cited

U.S. PATENT DOCUMENTS 10,766,804 B2 * 9/2020 Mitsugi ................ B23K 26/402
10,889,519 B2 * 1/2021 Ikai ........................ B65H 37/00
(Continued)

FOREIGN PATENT DOCUMENTS

JP 2015-174744 10/2015

OTHER PUBLICATIONS

International Search Report dated May 15, 2018 in International (PCT) Application No. PCT/JP2018/006490.
(Continued)

*Primary Examiner* — William A. Rivera
(74) *Attorney, Agent, or Firm* — Wenderoth, Lind & Ponack, L.L.P.

(57) ABSTRACT

A manufacturing method for a glass roll includes cutting a glass ribbon along a longitudinal direction thereof in a cutting region on a conveyance path while conveying the glass ribbon, and taking up the cut glass ribbon around a roll core at a downstream end of the conveyance path. A conveyance-mode changeable region is provided between the cutting region and the downstream end of the conveyance path. The conveyance-mode changeable region enables a change in conveyance mode between a first mode of conveying the glass ribbon in a tensioned state and a second mode of conveying the glass ribbon in a loosened state. After the leading end portion of the glass ribbon is wound around the roll core in the first conveyance mode, the conveyance mode is shifted from the first conveyance mode to the second conveyance mode.

6 Claims, 7 Drawing Sheets

(56) References Cited

U.S. PATENT DOCUMENTS

| | | | |
|---|---|---|---|
| 2011/0217521 A1* | 9/2011 | Teranishi | B32B 3/02 |
| | | | 428/189 |
| 2013/0129987 A1* | 5/2013 | Mitsugi | B32B 7/06 |
| | | | 428/189 |
| 2015/0251944 A1* | 9/2015 | Brackley | B26D 7/32 |
| | | | 83/23 |
| 2015/0299019 A1* | 10/2015 | Fujii | C03B 35/167 |
| | | | 65/53 |
| 2019/0161385 A1* | 5/2019 | Mitsugi | B23K 26/402 |
| 2019/0218132 A1* | 7/2019 | Mori | C03B 33/0235 |
| 2020/0079679 A1* | 3/2020 | Mori | C03B 35/16 |
| 2020/0361807 A1* | 11/2020 | Ikai | C03B 33/0235 |
| 2021/0130217 A1* | 5/2021 | Mori | C03B 33/091 |

OTHER PUBLICATIONS

International Preliminary Report on Patentability and Written Opinion of the International Searching Authority dated May 15, 2018 in International (PCT) Application No. PCT/JP2018/006490.

* cited by examiner

GLASS ROLL PRODUCTION METHOD

TECHNICAL FIELD

The present invention relates to a method of manufacturing a glass roll, which comprises: cutting a glass ribbon along a longitudinal direction thereof while conveying the glass ribbon; and taking up the cut glass ribbon around a roll core.

BACKGROUND ART

In recent years, a small thickness and a small weight are demanded for mobile terminals such as smartphones and tablet PCs which are rapidly spread. Thus, in the current condition, there is an increasing demand for reduction in thickness of glass substrates to be incorporated into those terminals. Under such current condition, a glass film which is a glass substrate reduced in thickness as small as that of a film (for example, thickness equal to or smaller than 300 µm) is now developed and manufactured.

In some cases, manufacturing steps for the glass film include a step of manufacturing a glass roll by taking up a glass ribbon, which serves as a base material of the glass roll, into a roll shape. One example of a specific method for performing the above-mentioned step is disclosed in Patent Literature 1.

In the method disclosed in Patent Literature 1, first, a glass ribbon is continuously formed by an overflow down-draw method. Next, the formed glass ribbon is cut along a longitudinal direction thereof while being conveyed. Along with the cutting, non-product portions (unnecessary parts including edge portions) located at both ends of the glass ribbon in a width direction of the glass ribbon are separated from a product portion (part which later becomes a product) located at a center in the width direction. Finally, the glass ribbon formed only of the product portion is taken up around the roll core, thereby manufacturing the glass roll.

In the method described above, at the time of taking up the glass ribbon, the glass ribbon is drawn to a periphery of the roll core under a state in which the glass ribbon is loosened. Thus, a magnitude of tension which acts on a part being taken up is approximately zero. In such a manner, the following disadvantages can be avoided.

When the glass ribbon is drawn to the periphery of the roll core under a state in which the glass ribbon is tensioned, that is, under a state in which tension acts on the glass ribbon, the tension acting on the part being taken up propagates to and act on parts being cut. Due to such propagation and action of the tension, quality of cut end portions which are formed along with the cutting is degraded, with the result that the glass ribbon becomes more liable to break. In contrast, in the method described above, the glass ribbon is drawn to the periphery of the roll core under the state in which the glass ribbon is loosened, thereby being capable of avoiding breakage of the glass ribbon.

CITATION LIST

Patent Literature

[PTL 1] JP 2015-174744 A

SUMMARY OF INVENTION

Technical Problem

However, although the method disclosed in Patent Literature 1 has the advantages described above, the following drawbacks are present.

Specifically, the glass ribbon is drawn to the periphery of the roll core under the state in which the glass ribbon is loosened, and hence, at the time of starting the operation of taking up the glass ribbon, that is, at the time of winding a leading end portion of the glass ribbon around the roll core, a proceeding direction of the leading end portion is more liable to be inappropriately inclined with respect to an originally set proceeding direction. Further, when the leading end portion is wound around the roll core under the state in which the proceeding direction is inclined, a part following the leading end portion is also wound around the roll core under the state in which the proceeding direction is inclined. As a result, rolling misalignment exceeding a tolerable range is liable to occur in the glass roll to be manufactured. Under such circumstances, there has been awaited establishment of a technology which is capable of not only avoiding breakage of the glass ribbon but also preventing the rolling misalignment of the glass roll.

The present invention which has been made in view of the circumstances described above has a technical object to achieve both avoidance of breakage of a glass ribbon and prevention of rolling misalignment of a glass roll at the time of manufacturing a glass roll by a method comprising: cutting a glass ribbon along a longitudinal direction thereof while conveying the glass ribbon; and taking up the cut glass ribbon around the roll core.

Solution to Problem

According to the subject application which has been made to solve the problem described above, there is provided a manufacturing method for a glass roll, comprising: cutting a glass ribbon along a longitudinal direction thereof in a cutting region on a conveyance path while conveying the glass ribbon; and taking up the cut glass ribbon around a roll core at a downstream end of the conveyance path, wherein a conveyance-mode changeable region is provided between the cutting region and the downstream end of the conveyance path, the conveyance-mode changeable region enabling a change in conveyance mode between a first conveyance mode of conveying the glass ribbon in a tensioned state and a second conveyance mode of conveying the glass ribbon in a loosened state, and wherein, after the leading end portion of the glass ribbon is wound around the roll core under a state in which the conveyance mode is held in the first conveyance mode, the conveyance mode is shifted from the first conveyance mode to the second conveyance mode.

In the present method, under the state in which the conveyance mode in the conveyance-mode changeable region is held in the first conveyance mode (mode of conveying the glass ribbon in the tensioned state), the leading end portion of the glass ribbon is wound around the roll core. In such a manner, when the leading end portion is wound around the roll core, not only a part of the glass ribbon passing through the conveyance-mode changeable region but also the leading end portion continuing from the part is also held in the tensioned state. Further, through winding of the leading end portion in the tensioned state, at the time of winding, inappropriate inclination of the proceeding direction of the leading end portion with respect to the originally set proceeding direction can be avoided. Accordingly, the leading end portion can be wound around the roll core without the inclination of the proceeding direction. In the present method, after the leading end portion is wound around the roll core, the conveyance mode in the conveyance-mode changeable region is shifted from the first conveyance mode to the second conveyance mode (mode of conveying the glass ribbon in the loosened state). When the conveyance mode is shifted in such a manner, owing to the presence of the loosened part in the conveyance-mode changeable region, a magnitude of the tension acting on a part being taken up, which is located on a downstream side of the conveyance path with respect to the conveyance-mode changeable region, may be approximately zero. However, as described above, the leading end portion has already been wound around the roll core without the inclination of the proceeding direction. Therefore, even when the magnitude of the tension acting on the part is approximately zero, a part following the leading end portion is wound around the roll core without inclination of the proceeding direction similarly to the leading end portion. As a result, the rolling misalignment of the glass roll can be prevented. Further, after the conveyance mode has been shifted as described above, the part being cut and the part being taken up in the glass ribbon are brought into a state of being divided into the upstream side and the downstream side of the conveyance path over the loosened part in the conveyance-mode changeable region. Accordingly, unlike the case in which the glass ribbon is continuously taken up in the first conveyance mode without shifting of the conveyance mode, the tension acting on the part being taken up may not propagate to and act on the part being cut. In the present method, at the time of winding the leading end portion around the roll core, the tension propagates to and acts on the part being cut. However, the continuation of the state in which the tension acts on the part being cut is limited to a period until the conveyance mode is subsequently shifted to the second conveyance mode. Therefore, influence of the action of the tension can be suppressed as much as possible. As a result, degradation in quality of the cut end portions formed along with cutting can be prevented, thereby being capable of avoiding breakage of the glass ribbon. With the above-mentioned features, according to the present method, both avoidance of the breakage of the glass ribbon and the prevention of the rolling misalignment of the glass roll can be achieved.

In the above method, it is preferred that, after the glass ribbon is wound around the roll core by one or more turns from the leading end portion of the glass ribbon, the conveyance mode be shifted from the first conveyance mode to the second conveyance mode.

In such a manner, after the leading end portion of the glass ribbon is wound around the roll core, at least until the leading end portion is sandwiched between the part following the leading end portion and the roll core, the tensioned state of the part being taken up is maintained. Therefore, the inclination of the proceeding direction of the part following the leading end portion with respect to the originally set proceeding direction can more easily be avoided. As a result, the rolling misalignment of the glass roll can more reliably be prevented.

In the above method, it is preferred that, in the first conveyance mode, the glass ribbon in the conveyance-mode changeable region is conveyed in a horizontal state while being supported from the lower side, and in the second conveyance mode, the glass ribbon in the conveyance-mode changeable region is released from the state of being supported from the lower side and is conveyed while being bent downward.

In such a manner, the conveyance mode can be switched between the first conveyance mode and the second conveyance mode by only switching the state of the part of the glass ribbon passing through the conveyance-mode changeable region between the state in which the part is supported from the lower side and the state in which the support from the lower side is released. Therefore, the effect of the present invention can be attained through a simple operation.

In the above method, it is preferred that, the manufacturing method for a glass roll further comprise a support member, which is arranged in the conveyance-mode changeable region, wherein the support member is configured to pivot about a rotation shaft, which extends along a width direction of the glass ribbon and is arranged at an upstream end in the conveyance-mode changeable region, to thereby change a posture thereof between a supporting posture for supporting the glass ribbon from the lower side and a releasing posture for releasing the state of supporting the glass ribbon from the lower side, and wherein, when a part of the glass ribbon is cut out and discarded as a discard part, under a state in which the support member is allowed to assume the releasing posture, the discard part is dropped below the conveyance-mode changeable region to be discarded.

In such a manner, through the use of the conveyance-mode changeable region, the discard part having been cut out from the glass ribbon can be efficiently discarded by dropping the discard part from the conveyance-mode changeable region. Further, the support member pivots about the rotation shaft, which extends along the width direction of the glass ribbon and is arranged at the upstream end in the conveyance-mode changeable region, thereby being capable of changing the posture between the supporting posture and the releasing posture. With such configuration, the following advantages can also be attained. That is, at the time of discarding the discard part, when the posture of the support member is to be shifted to the releasing posture, along with the pivoting about the rotation shaft, the support member moves downward while moving toward the upstream side of the conveyance path. Then, the discard part passes over the support member having performed such movement, and thereafter is dropped to be discarded. That is, at the time of discarding the discard part, collision between the discard part and the support member can suitably be prevented. As a result, defects such as adhesion of glass powder, which is formed by the collision between the discard part and the support member, to the support member and damage caused by the glass powder on the glass ribbon passing over the support member restored to the supporting posture can be avoided.

In the above method, it is preferred that, a downward bending amount of the glass ribbon in the second conveyance mode be maintained constant.

In such a manner, with regard to the glass ribbon passing through the conveyance-mode changeable region in the second conveyance mode, breakage of the part due to bending stress caused by increase in curvature of the part due to excessive downward bending of the part can easily be avoided.

In the above method, it is preferred that, under a state in which a conveyance speed of the glass ribbon on an upstream side with respect to the conveyance-mode changeable region on the conveyance path is maintained constant, a conveyance speed of the glass ribbon on a downstream side with respect to the conveyance-mode changeable region on the conveyance path is adjusted, to thereby maintain the bending amount constant.

In such a manner, the part being cut which is located on the upstream side of the conveyance path with respect to the loosened part in the conveyance-mode changeable region is conveyed at a constant speed, thereby being capable of stably cutting the glass ribbon. Accordingly, quality of the cut end portions formed along with the cutting can be improved, thereby being capable of enhancing quality of the glass ribbon after cutting.

Advantageous Effects of Invention

According to the present invention, both avoidance of breakage of a glass ribbon and prevention of rolling misalignment of a glass roll at the time of manufacturing a glass roll by a method comprising: cutting a glass ribbon along a longitudinal direction thereof while conveying the glass ribbon; and taking up the cut glass ribbon around the roll core can be achieved.

DESCRIPTION OF EMBODIMENTS

Now, with reference to the accompanying drawings, description is made of a manufacturing method for a glass roll according to an embodiment of the present invention. First, description is made of a configuration of a manufacturing apparatus to be used for the manufacturing method for a glass roll according to the embodiment of the present invention.

Figure 1:
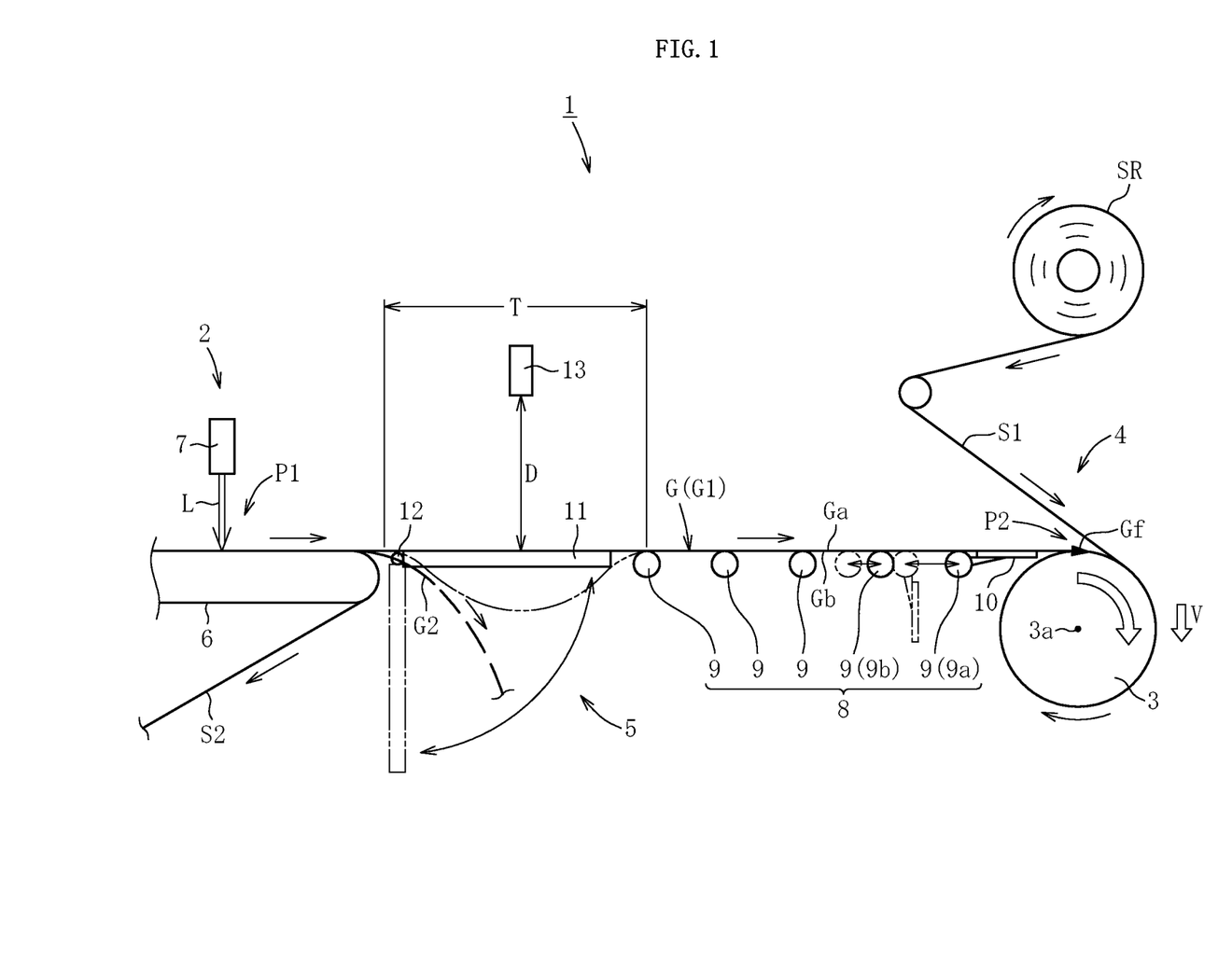
FIG. 1 is a side view for illustrating a manufacturing apparatus to be used for a manufacturing method for a glass roll according to an embodiment of the present invention.

As illustrated in FIG. 1, a manufacturing apparatus 1 comprises a cutting mechanism 2, a take-up mechanism 4, and a conveyance-mode changeable mechanism 5. The cutting mechanism 2 is configured to cut a glass ribbon G along a longitudinal direction in a cutting region P1 on a conveyance path while conveying the glass ribbon G, to thereby separate a product portion G1 (part which later becomes a product) and non-product portions G2 (unnecessary parts including edge portions) of the glass ribbon G from each other. The take-up mechanism 4 is configured to take up the cut glass ribbon G (product portion G1 having been separated from the non-product portions G2) around a roll core 3 under a state in which the glass ribbon G is laminated on a band-shaped protection sheet S1 at a downstream end P2 of the conveyance path, to thereby produce a glass roll GR (illustrated in FIG. 6 to be referred to later). The conveyance-mode changeable mechanism 5 is configured to change a conveyance mode of the glass ribbon G in a conveyance-mode changeable region T provided on the conveyance path between a first conveyance mode of conveying the glass ribbon G in a tensioned state (state indicated by the solid line in FIG. 1) and a second conveyance mode of conveying the glass ribbon G in a loosened state (state indicated by the two-dot chain line in FIG. 1).

The glass ribbon G subjected to cutting is a glass which is continuously formed by a down-draw method (for example, an overflow down-draw method) and thereafter is changed in its conveyance direction from a vertically downward direction to a horizontal direction. The glass ribbon G comprises the non-product portions G2 and the product portion G1. The non-product portions G2 are located at both ends in a width direction of the glass ribbon G (direction perpendicular to the drawing sheet in FIG. 1). The product portion G1 is located at a center in the width direction. The glass ribbon G is formed so as to have a thickness (for example, 300 μm or less) that may give flexibility to the glass ribbon G. A forming method for the glass ribbon G is not limited to the overflow down-draw method mentioned above, and any other method such as a float method, a slot down-draw method, or a redraw method may be used.

The cutting mechanism 2 includes a conveying device 6 and a cutting device 7. The conveying device 6 is configured to convey the glass ribbon G in the cutting region P1. The cutting device 7 is configured to cut the glass ribbon G being conveyed.

As the conveying device 6, a belt conveyor configured to convey the glass ribbon G in a horizontal state. As a matter of course, the conveying device 6 is not limited to the belt conveyor, and any other conveyor such as a roller conveyor may be used.

A band-shaped protection sheet S2 is supplied to a conveyance surface of the conveying device 6. The band-shaped protection sheet S2 is conveyed together with the glass ribbon G toward a downstream side. After that, the band-shaped protection sheet S2 is drawn downward from the conveying device 6 to be separated from the conveyance path of the glass ribbon G. As the band-shaped protection sheet S2, there may be used, for example, a foam resin sheet. With the band-shaped protection sheet S2, a lower surface Gb of the glass ribbon G being conveyed on the conveying device 6 is protected.

As the cutting device 7, a laser cutter arranged above the conveyance path of the glass ribbon G is used. The laser cutter is configured to radiate a laser L along a boundary between the product portion G1 and each of the non-product portion G2 of the glass ribbon G passing below the laser cutter.

With the cutting mechanism 2 described above, the glass ribbon G is continuously cut with the laser L, to thereby separate the product portion G1 and each of the non-product portions G2 from each other. A specific method of separating the product portion G1 and each of the non-product portions G2 from each other may be, for example, a laser fusing method or a laser cleaving method. The non-product portion G2 having been separated from the product portion G1 is separated downward from the conveyance path of the glass ribbon G (product portion G1), and is cut into a length suitable for discarding and then is discarded. Such cutting is performed by curving an upper surface Ga side of the non-product portion G2 into a protruding shape to apply bending stress thereto. In this embodiment, in order to facilitate cutting of the non-product portion G2, a scratching unit (not shown) is used to scratch an end portion of the non-product portion G2 in the width direction at every length suitable for discarding. Accordingly, the non-product portion G2 can more easily be cut (broken) with the scratch as a starting point. As the scratching unit, there may be used, for example, a diamond grinder, a diamond chip, or abrasive paper.

The take-up mechanism 4 comprises a conveying device 8 and the roll core 3. The conveying device 8 is configured to convey the glass ribbon G in a horizontal state while supporting the glass ribbon G from the lower side. The roll core 3 is configured to take up the glass ribbon G having been conveyed from the conveying device 8.

The conveying device 8 comprises a plurality of (five in FIG. 1) conveyance rollers 9 arrayed along the conveyance path. All of the plurality of conveyance rollers 9 are free rollers. Among the plurality of conveyance rollers 9, a most-downstream-side conveyance roller 9a, which is arranged on the most downstream side, and a conveyance roller 9b, which is arranged adjacent to an upstream side of the most-downstream-side conveyance roller 9a, are movable along the conveyance path. In detail, the conveyance rollers 9a and 9b are movable along the conveyance path between a base position (position indicated by the solid lines in FIG. 1) and a separation position (position indicated by the two-dot chain lines in FIG. 1) separated from the base position on the upstream side. The conveyance rollers 9a and 9b form a movable conveyance unit of the conveying device 8. Each of the conveyance rollers 9a and 9b is capable of supporting the glass ribbon G also while moving.

The most-downstream-side conveyance roller 9a, which is arranged more on the downstream side on the conveyance path, of the conveyance rollers 9a and 9b has a longer movement distance from the base position to the separation position. The movement distance of the most-downstream-side conveyance roller 9a falls within a range of from 50 mm to 200 mm.

In this embodiment, only the conveyance rollers 9a and 9b serve as the movable conveyance unit. That is, only the two conveyance rollers 9 on the downstream side including the most-downstream-side conveyance roller 9a serve as the movable conveyance unit. However, the present invention is not limited to this configuration. Three or four or more conveyance rollers 9 on the downstream side including the most-downstream-side conveyance roller 9a may serve as the movable conveyance unit. In this case, the movement distance from the base position to the separation position is set longer for the conveyance roller 9 arranged on the downstream side of the conveyance path.

The most-downstream-side conveyance roller 9a is coupled to a transfer assisting mechanism 10 configured to assist transfer of a leading end portion Gf of the glass ribbon G from the conveying device 8 onto the roll core 3. The transfer assisting mechanism 10 is formed of a plate-shaped member having a thickness smaller than a radius of the most-downstream-side conveyance roller 9a. The transfer assisting mechanism 10 has a rectangular shape in plan view, and two parallel sides among four sides of the rectangular shape extend along the width direction of the glass ribbon G (axial direction of the most-downstream-side conveyance roller 9a).

The transfer assisting mechanism 10 is movable between an assist position and a retreat position. The assist position is a position for assisting the transfer by supporting the glass ribbon G from the lower side between the conveying device 8 and the roll core 3. The retreat position is a position apart from the roll core 3 more than the assist position. When the transfer assisting mechanism 10 takes the assist position, the transfer assisting mechanism 10 is capable of supporting an entire width of the glass ribbon G (product portion G1) passing over the transfer assisting mechanism 10. Moreover, the transfer assisting mechanism 10 can pivot about the most-downstream-side conveyance roller 9a, thereby being capable of changing a posture thereof between a horizontal posture and a vertical posture with the pivoting action. The transfer assisting mechanism 10 is capable of pivoting independently of the rotation of the most-downstream-side conveyance roller 9a. That is, even during the rotation of the most-downstream-side conveyance roller 9a, the transfer assisting mechanism 10 is capable of maintaining the horizontal posture or the vertical posture irrespective of the rotation.

In FIG. 1, a state in which the transfer assisting mechanism 10 assumes the horizontal posture to take the assist position is indicated by the solid lines, and a state in which the transfer assisting mechanism 10 assumes the vertical posture and moves from the assist position to the retreat position is indicated by the two-dot chain lines.

In this embodiment, the transfer assisting mechanism 10 is formed of the plate-shaped member having a thickness smaller than a radius of the most-downstream-side conveyance roller 9a. However, the present invention is not limited to this configuration. The plate-shaped member may have a thickness larger than the radius of the most-downstream-side conveyance roller 9a. However, even in this case, it is preferred that the plate-shaped member have a thickness smaller than the diameter of the most-downstream-side conveyance roller 9a.

The roll core 3 is rotatable (in a clockwise direction in FIG. 1) about an axial center 3a extending along the width direction of the glass ribbon G, and the rotation number thereof can be freely changed. The roll core 3 has a diameter larger than a diameter of the most-downstream-side conveyance roller 9a. The axial center 3a is located below the downstream end P2 of the conveyance path of the glass ribbon G, and the roll core 3 takes up the glass ribbon G, which has been transferred from the conveying device 8, with the lower surface Gb side of the glass ribbon G placed on an inner side. Moreover, as indicated by the arrow V, the roll core 3 is capable of gradually moving downward while taking up the glass ribbon G. With this configuration, even when a diameter of the glass roll GR gradually increases along with the progress of the take-up action, a part of the glass ribbon G extending between the most-downstream-side conveyance roller 9a and the roll core 3 is maintained in a horizontal posture.

The band-shaped protection sheet S1 is supplied from the upper surface Ga side to the glass ribbon G having been transferred to the roll core 3. As the band-shaped protection sheet S1, there may be used, for example, a resin sheet (for example, PET film). The band-shaped protection sheet S1 is partially wound around the roll core 3 already in a stage before starting winding of the glass ribbon G around the roll core 3, and is continuously drawn out along with the rotation of the roll core 3 from a sheet roll SR arranged above the roll core 3. The band-shaped protection sheet S1 is wound around the roll core 3 in a tensioned state (state in which tension acts on the band-shaped protection sheet S1).

The conveyance-mode changeable mechanism 5 comprises a support member 11 capable of switching, with regard to the glass ribbon G which is present in the conveyance-mode changeable region T located between the conveying device 6 and the conveying device 8, between (1) a state of conveying the glass ribbon G in a horizontal state while supporting the glass G from the lower side and (2) a state of conveying the glass ribbon G while releasing the support from the lower side and bending the glass ribbon G downward. When the state (1) is brought about by the support member 11, the conveyance mode can be set to the first conveyance mode. When the state (2) is brought about, the conveyance mode can be set to the second conveyance mode.

The support member 11 is formed of a rectangular plate-shaped member having a width dimension smaller than an entire width of the product portion G1, and two parallel sides among four sides of the rectangular shape extend along the width direction of the glass ribbon G. The support member 11 is pivotable about a rotation shaft 12, which extends along the width direction of the glass ribbon G and is arranged at an upstream end in the conveyance-mode changeable region T. Through pivoting about the rotation shaft 12, the support member 11 can be changed in posture between a supporting posture and a releasing posture. The supporting posture is a posture for supporting the glass ribbon G from the lower side. The releasing posture is a posture for releasing the support from the lower side. In FIG. 1, a state in which the support member 11 assumes the supporting posture is indicated by the solid lines, and a state in which the support member 11 assumes the releasing posture is indicated by the two-dot chain lines.

In this embodiment, the conveyance-mode changeable region T is located between the conveying device 6 and the conveying device 8. However, the present invention is not limited to this configuration. The conveyance-mode changeable region T may be located at any region between the cutting region P1 and the downstream end P2 on the conveyance path of the glass ribbon G.

In the conveyance-mode changeable region T, above the conveyance path of the glass ribbon G, there is arranged a detector 13 configured to detect a mutual distance between the detector 13 and the upper surface Ga of the glass ribbon G (product portion G1). In this embodiment, an ultrasonic sensor is used as the detector 13. The mutual distance D detected by the detector 13 can be transmitted as a signal to a drive source (not shown) for the roll core 3, and the drive source is capable of adjusting the rotation number of the roll core 3 based on the received signal.

Next, description is made of a manufacturing method for a glass roll according to the embodiment of the present invention using the manufacturing apparatus 1 described above.

In an initial state before starting manufacture of the glass roll, the transfer assisting mechanism 10 takes the assist position, the most-downstream-side conveyance roller 9a and the conveyance rollers 9b take respective base positions, and the support member 11 assumes the supporting posture.

When the manufacture of the glass roll is started, and the leading end portion Gf of the glass ribbon G is conveyed to the cutting region P1 on the conveyance path, separation of the product portion G1 and the non-product portions G2 of the glass ribbon G is started. The non-product portions G2 having been separated are discarded. The leading end portion Gf of the glass ribbon G (product portion G1) from which the non-product portions G2 have been separated is transferred from the conveying device 6 to the support member 11 assuming the supporting posture, and is allowed to pass through the conveyance-mode changeable region T while being moved on the support member 11. At this time point, the conveyance mode in the conveyance-mode changeable region T is the first conveyance mode. The feeding speed of the glass ribbon G by the conveying device 6 is always maintained at a constant speed from the start to the end of the manufacture of the glass roll.

Figure 2:
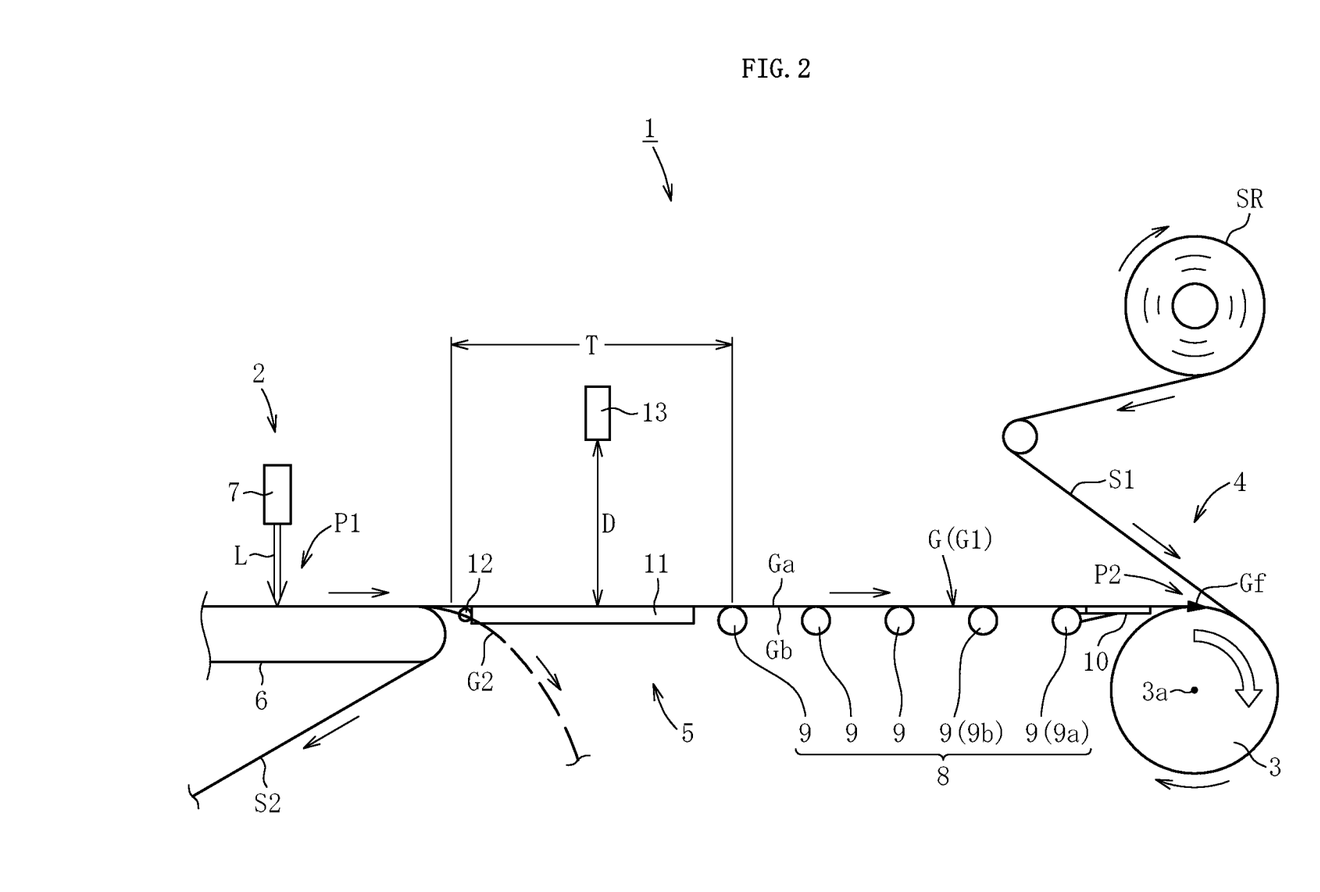
FIG. 2 is a side view for illustrating the manufacturing method for a glass roll according to the embodiment of the present invention.

After that, with regard to the leading end portion Gf of the glass ribbon G having been further transferred from the support member 11 to the conveying device 8, as illustrated in FIG. 2, the leasing end portion Gf is transferred from the conveying device 8 (most-downstream-side conveyance roller 9a) onto the roll core 3 while being supported from the lower side by the transfer assisting mechanism 10 taking the assist position. The leading end portion Gf of the glass ribbon G having been transferred onto the roll core 3 is wound around the roll core 3 while being sandwiched between the roll core 3 and the band-shaped protection sheet S1. Also at this time point, the conveyance mode in the conveyance-mode changeable region T is the first conveyance mode. In this embodiment, after the leading end portion Gf is wound around the roll core 3, the leading end portion Gf is wound around the roll core 3 by at least one turn, preferably three turns, and then the operation described below is performed.

Figure 3:
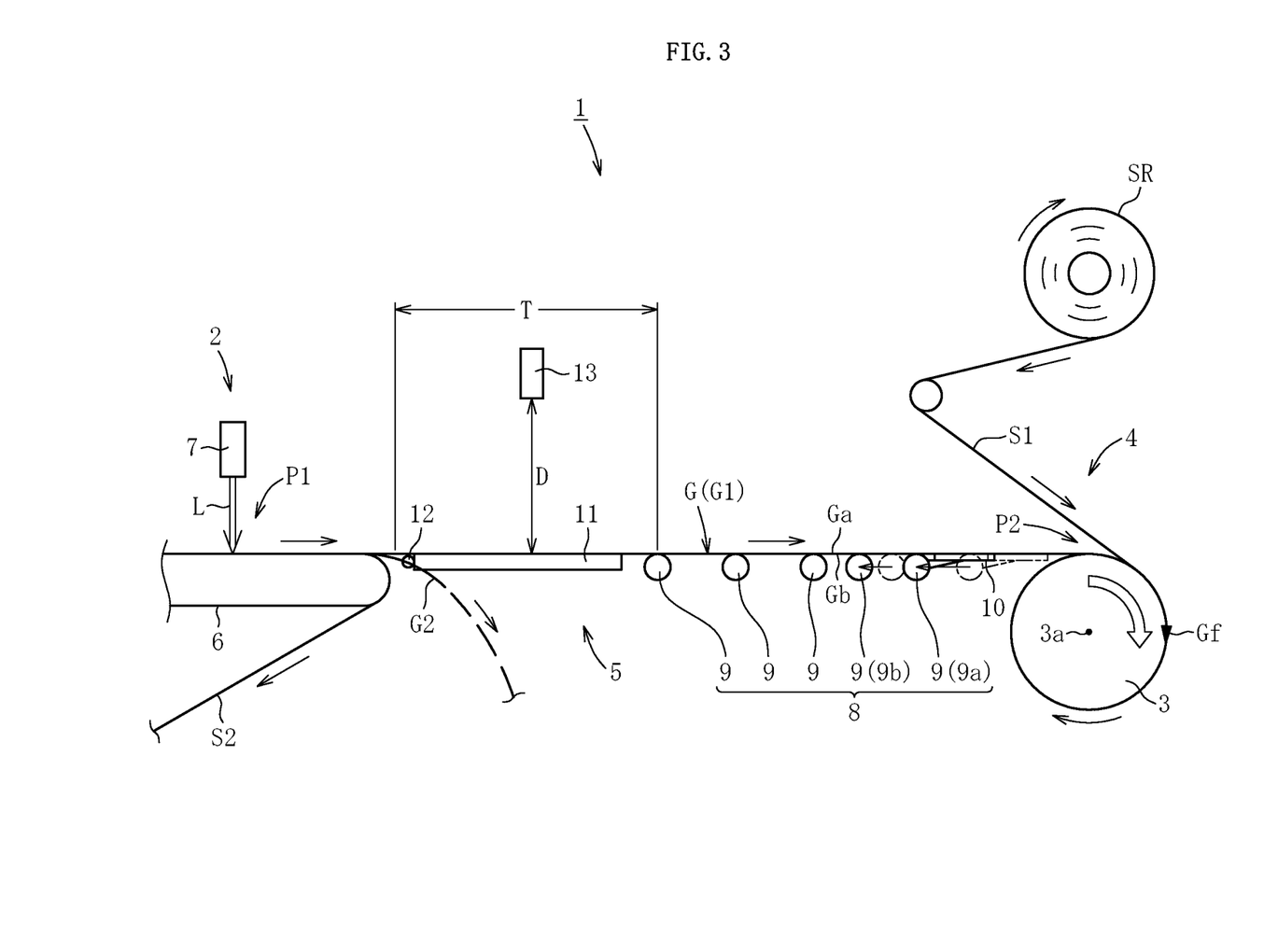
FIG. 3 is a side view for illustrating the manufacturing method for a glass roll according to the embodiment of the present invention.

After the leading end portion Gf is wound around the roll core 3, preparation for moving the transfer assisting mechanism 10 from the assist position to the retreat position is started. For the preparation, as illustrated in FIG. 3, the most-downstream-side conveyance roller 9a and the conveyance roller 9b provided to the conveying device 8 are moved from the respective base positions to the respective separation positions. In such a manner, the transfer assisting mechanism 10 coupled to the most-downstream-side conveyance roller 9a, in a state of being adjacent to the most-downstream-side conveyance roller 9a while maintaining the horizontal posture, moves from the assist position toward the upstream side through use of a space formed with the movement of the most-downstream-side conveyance roller 9a. At this time, the transfer assisting mechanism 10 moves from the assist position toward the upstream side in synchronization with the movement of the most-downstream-side conveyance roller 9a from the base position to the separation position. Also at this time point, the conveyance mode in the conveyance-mode changeable region T is the first conveyance mode.

Figure 4:
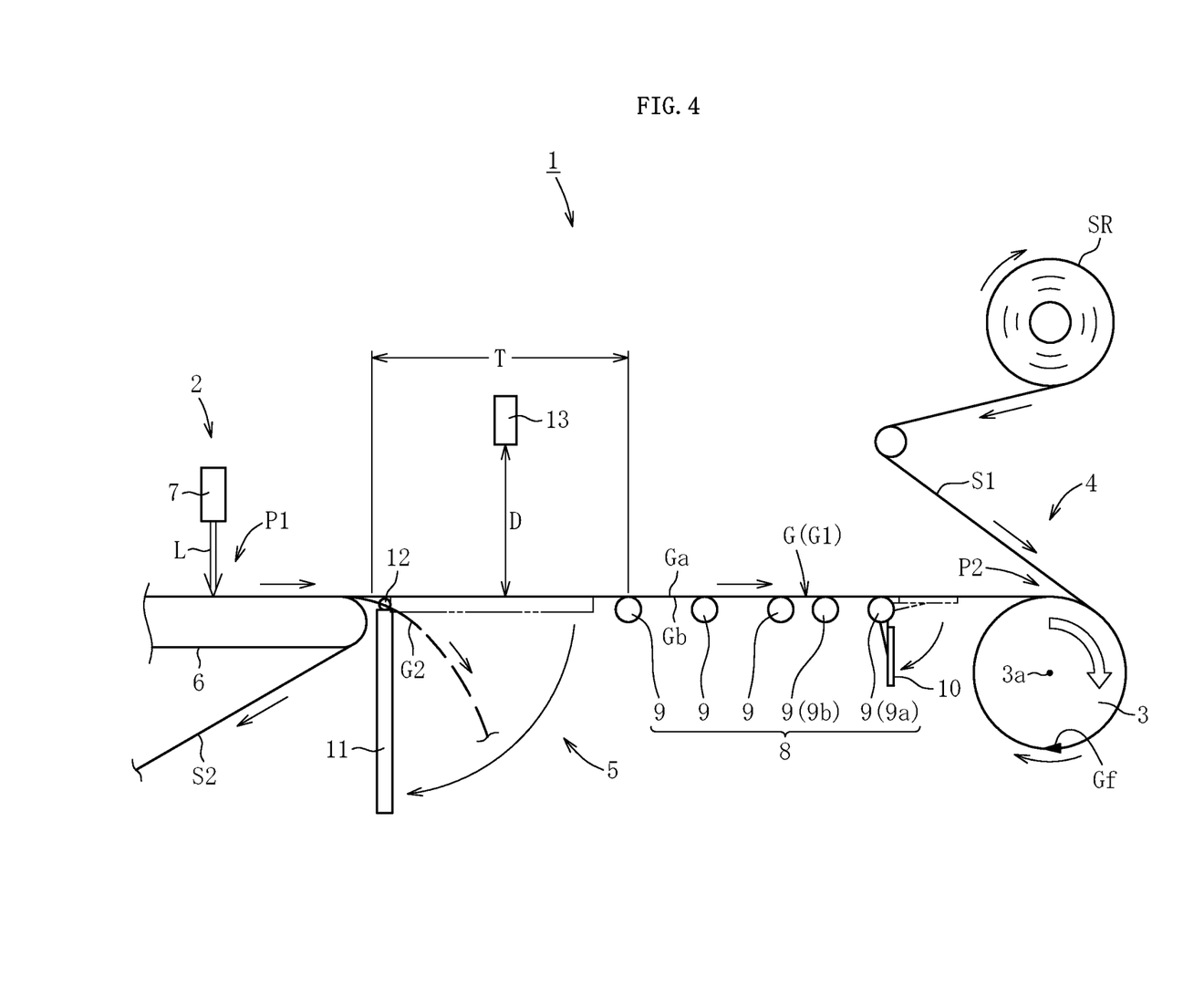
FIG. 4 is a side view for illustrating the manufacturing method for a glass roll according to the embodiment of the present invention.

After the most-downstream-side conveyance roller 9a and the transfer assisting mechanism 10 have been moved, as illustrated in FIG. 4, the transfer assisting mechanism 10 is allowed to pivot about the most-downstream-side conveyance roller 9a, to thereby change the posture of the transfer assisting mechanism 10 assuming the horizontal posture to the vertical posture. At the same timing as the change in posture of the transfer assisting mechanism 10, the support member 11 is allowed to pivot about the rotation shaft 12, to thereby change the posture of the support member 11 assuming the supporting posture to the releasing posture. In such a manner, the support for the glass ribbon G from the lower side in the conveyance-mode changeable region T is released, and shifting of the conveyance mode from the first conveyance mode to the second conveyance mode is started.

Figure 5:
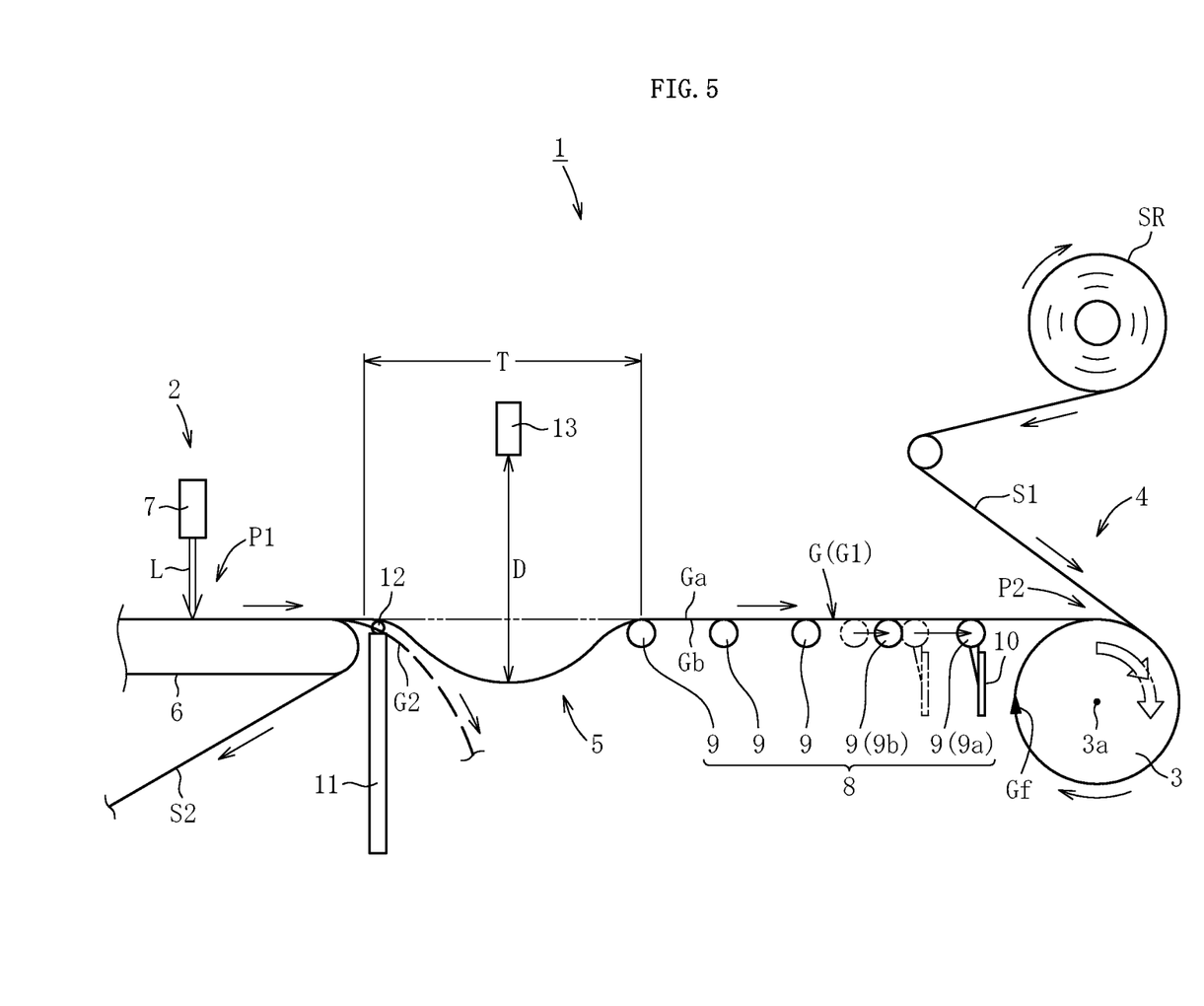
FIG. 5 is a side view for illustrating the manufacturing method for a glass roll according to the embodiment of the present invention.

For the shifting of the conveyance mode, as illustrated in FIG. 5, the rotation number of the roll core 3 is reduced. In such a manner, the conveyance speed of the glass ribbon G on the downstream side over the conveyance-mode changeable region T is set lower than the conveyance speed of the glass ribbon G on the upstream side (feeding speed by the conveying device 6). When the speed difference is given in such a manner, the glass ribbon G in the conveyance-mode changeable region T is bent downward, and the conveyance mode is shifted from the first conveyance mode to the second conveyance mode. When the conveyance mode is to be shifted, in parallel with the shifting, the most-downstream-side conveyance roller 9a and the conveyance roller 9b are restored from the respective separation positions to the respective base positions. Concomitantly with the restoration of the conveyance rollers 9a and 9b, the transfer assisting mechanism 10 moves toward the downstream side of the conveyance path while maintaining the vertical posture, and then stops. The position at which the transfer assisting mechanism 10 stops corresponds to the retreat position of the transfer assisting mechanism 10.

After the conveyance mode in the conveyance-mode changeable region T has been shifted to the second conveyance mode, control is performed so as to maintain a constant downward bending amount of glass ribbon G. Specifically, control is performed so that the mutual distance D detected by the detector 13 is maintained at a reference value set in advance, to thereby maintain a constant bending amount. When the detected mutual distance D exceeds the reference value, that is, when the bending amount is larger than an appropriate amount, the rotation number of the roll core 3 is increased based on a signal from the detector 13. In such a manner, the take-up speed by the roll core 3 is set higher than the feeding speed (constant speed) by the conveying device 6, thereby reducing the bending amount so as to set the mutual distance D close to the reference value. Meanwhile, when the detected mutual distance D is smaller than the reference value, that is, the bending amount is smaller than an appropriate amount, the rotation number of the roll core 3 is reduced based on a signal from the detector 13. In such a manner, the take-up speed by the roll core 3 is set lower than the feeding speed (constant speed) by the conveying device 6, thereby increasing the bending amount so as to set the mutual distance D close to the reference value.

Figure 6:
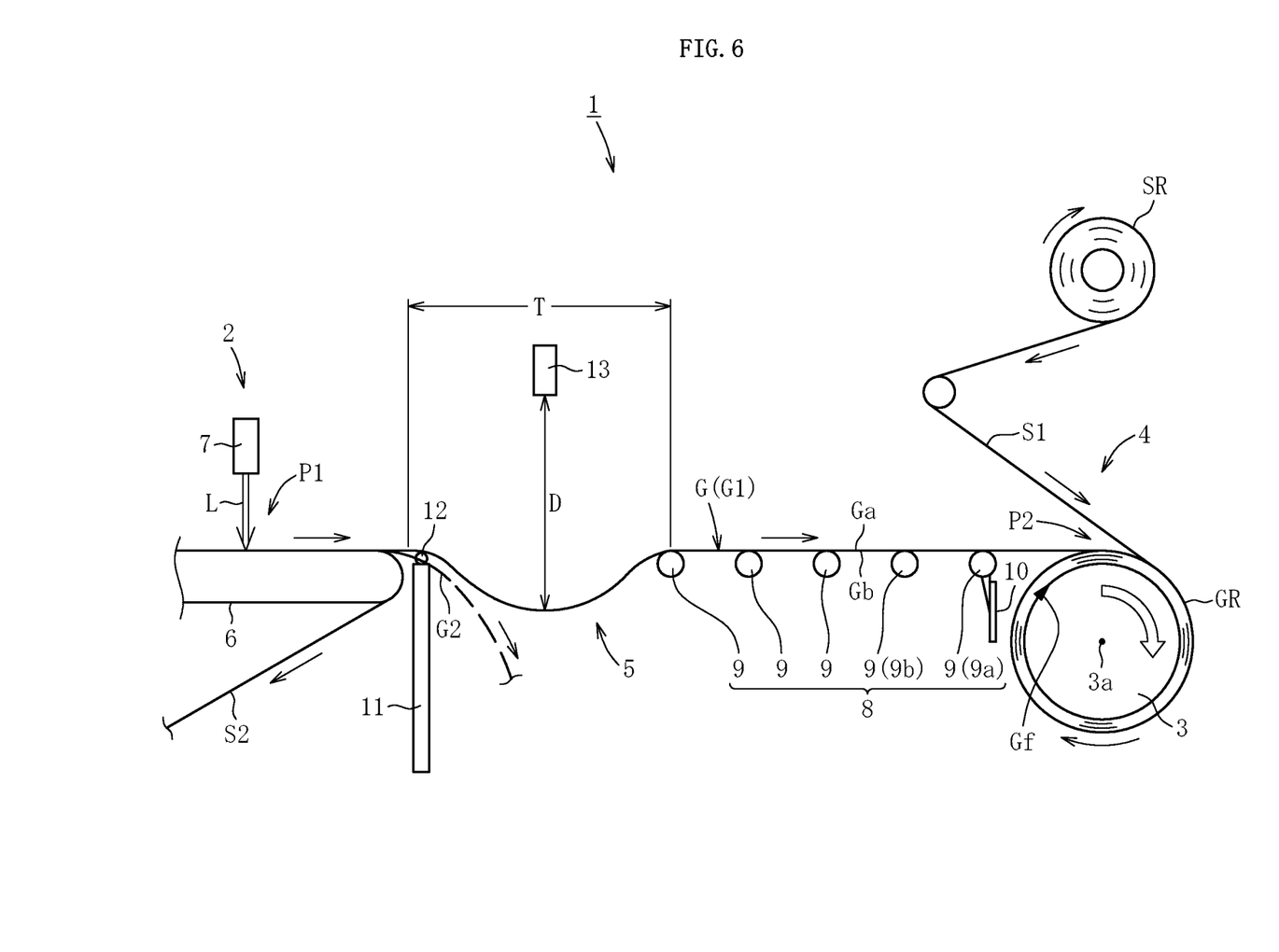
FIG. 6 is a side view for illustrating the manufacturing method for a glass roll according to the embodiment of the present invention.

In the manner as described above, the operation of taking up the glass ribbon G is continued while maintaining a constant bending amount of the glass ribbon G in the conveyance-mode changeable region T. Then, in this state, as illustrated in FIG. 6, the operation of taking up is continued until the glass ribbon G around the roll core 3 reaches a desired length, thereby completing the glass roll GR.

Figure 7:
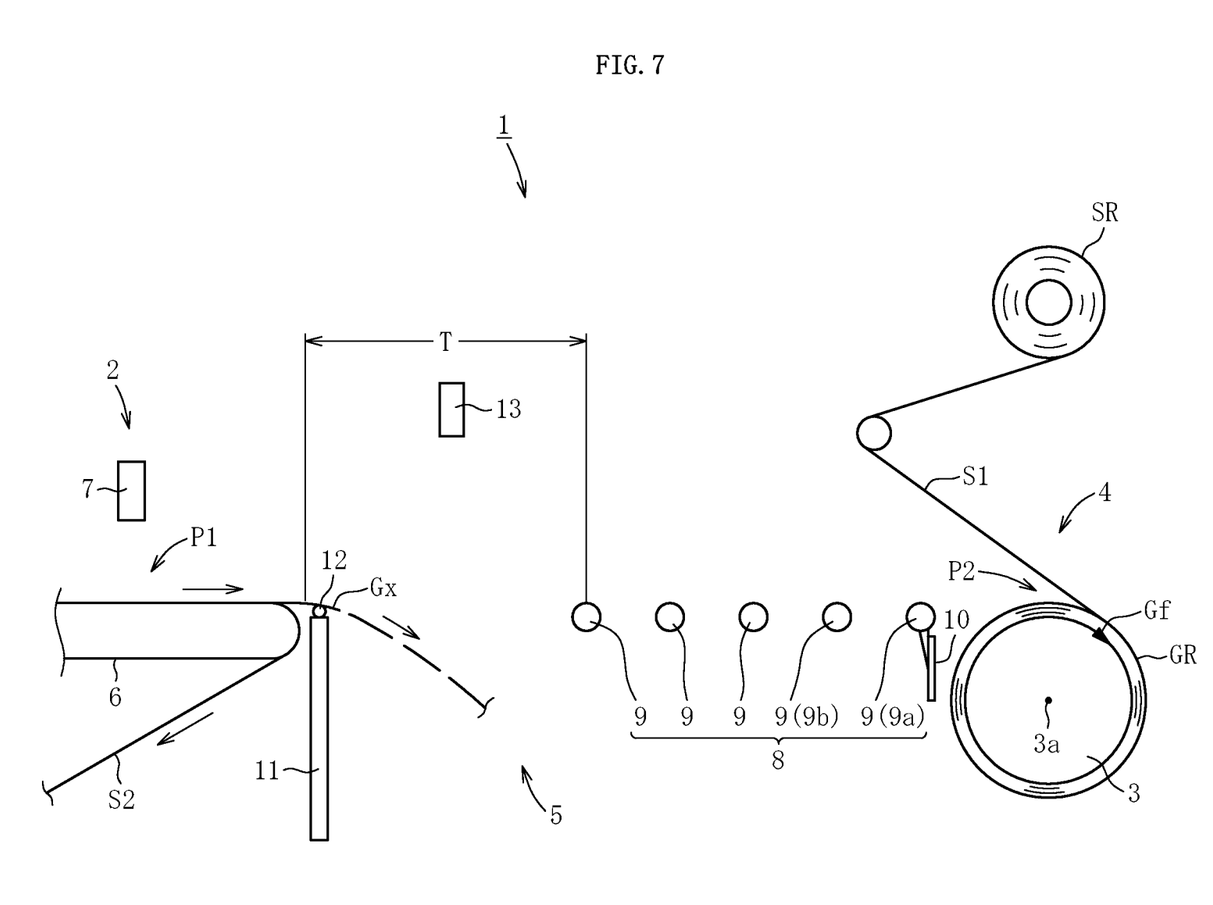
FIG. 7 is a side view for illustrating the manufacturing method for a glass roll according to the embodiment of the present invention.

During the manufacture of the glass roll GR, in some cases, it is required that some sections be taken out from the glass ribbon G and discarded as a discard part Gx. For example, there are a case in which separation of the product portion G1 and the non-product portions G2 temporarily cannot be performed for maintenance and inspection of the cutting device 7, and a case in which, after completion of the glass roll GR obtained by taking up the glass roll G having a desired length, the roll core 3 is replaced to newly start the operation of taking up the glass ribbon G. In such cases, the manufacture of the glass roll GR is temporarily stopped, and as illustrated in FIG. 7, under the state in which the support member 11 is allowed to assume the releasing posture, the discard part Gx is dropped below the conveyance-mode changeable region T to be discarded. With regard to the discard part Gx, a scratching unit (not shown) is used to scratch an end portion of the discard part Gx in the width direction at every length suitable for discarding. Then, the discard part Gx is cut with the scratch as a starting point. As the scratching unit, there may be used, for example, a diamond grinder, a diamond chip, or abrasive paper. A leading end portion and a trailing end portion of the discard part Gx are also similarly formed by scratching through use of a scratching member (not shown) along the width direction of the glass ribbon G and cutting the discard part Gx. In a case of restarting the manufacture of the glass roll GR having been temporarily stopped, the transfer assisting mechanism 10, the most-downstream-side conveyance roller 9a, the conveyance rollers 9b, and the support member 11 are restored to the positions or postures in the above-mentioned initial state.

Next, description is made of main actions and effects of the manufacturing method for a glass roll described above.

In the manufacturing method for a glass roll described above, under a state in which the conveyance mode in the conveyance-mode changeable region T is held in the first conveyance mode, the leading end portion Gf of the glass ribbon G is wound around the roll core 3. In such a manner, the leading end portion Gf is wound around the roll core 3 in the tensioned state. Therefore, at the time of winding, inappropriate inclination of the proceeding direction of the leading end portion Gf with respect to the originally set proceeding direction can be avoided. Moreover, inclination of the proceeding direction of the leading end portion Gf can be avoided. Therefore, also with regard to the part following the leading end portion Gf, the glass ribbon G can be wound around the roll core 3 without inclination of the proceeding direction. As a result, the rolling misalignment of the glass roll GR can be prevented. Further, after the conveyance mode in the conveyance-mode changeable region T has been shifted from the first conveyance mode to the second conveyance mode, the part being cut and the part of being taken up in the glass ribbon G are brought into a state of being divided into the upstream side and the downstream side over the loosened part in the conveyance-mode changeable region T. Accordingly, unlike the case in which the glass ribbon is continuously taken up in the first conveyance mode without shifting of the conveyance mode, the tension acting on the part being taken up may not propagate to and act on the part being cut. As a result, degradation in quality of the cut end portions formed along with cutting can be prevented, thereby being capable of avoiding breakage of the glass ribbon G.

The manufacturing method for a glass roll according to the present invention is not limited to the mode described in the above-mentioned embodiment. For example, in the above-mentioned embodiment, the roll core 3 is arranged below the conveyance surface of the conveying device 8, but the present invention is not limited thereto. The glass roll GR may be produced by installing the roll core 3 above the conveyance surface of the conveying device 8, arranging the sheet roll SR below the conveyance surface of the conveying device 8, and taking up the glass roll G with the upper surface Ga placed on an inner side. In this case, unlike the above-mentioned embodiment, the mechanism for moving the conveyance rollers 9a and 9b may be omitted so that positions of the conveyance rollers 9a and 9b are fixed, and the transfer assisting mechanism 10 may be omitted. Moreover, in the above-mentioned embodiment, the transfer assisting mechanism 10 and the support member 11 are allowed to pivot at the same time after starting the operation of taking up the glass ribbon into the glass roll GR, but the present invention is not limited thereto. The transfer assisting mechanism 10 may pivot first, or the support member 11 may pivot first.

REFERENCE SIGNS LIST

G glass ribbon
Gf leading end portion
Gx discard part
GR glass roll
P1 cutting region
P2 downstream end
T conveyance-mode changeable region 3 roll core
11 support member
12 rotation shaft

The invention claimed is:

1. A manufacturing method for a glass roll, comprising:
cutting a glass ribbon along a longitudinal direction thereof in a cutting region on a conveyance path while conveying the glass ribbon; and
taking up the cut glass ribbon around a roll core at a downstream end of the conveyance path,
wherein a conveyance-mode changeable region is provided between the cutting region and the downstream end of the conveyance path, the conveyance-mode changeable region enabling a change in conveyance mode between a first conveyance mode of conveying the glass ribbon in a tensioned state and a second conveyance mode of conveying the glass ribbon in a loosened state, and
wherein, after the leading end portion of the glass ribbon is wound around the roll core under a state in which the conveyance mode is held in the first conveyance mode, the conveyance mode is shifted from the first conveyance mode to the second conveyance mode.

2. The manufacturing method for a glass roll according to claim 1, wherein, after the glass ribbon is wound around the roll core by one or more turns from the leading end portion of the glass ribbon, the conveyance mode is shifted from the first conveyance mode to the second conveyance mode.

3. The manufacturing method for a glass roll according to claim 1,
wherein, in the first conveyance mode, the glass ribbon in the conveyance-mode changeable region is conveyed in a horizontal state while being supported from the lower side, and
wherein, in the second conveyance mode, the glass ribbon in the conveyance-mode changeable region is released from the state of being supported from the lower side and is conveyed while being bent downward.

4. The manufacturing method for a glass roll according to claim 3, further comprising a support member, which is arranged in the conveyance-mode changeable region,
wherein the support member is configured to pivot about a rotation shaft, which extends along a width direction of the glass ribbon and is arranged at an upstream end in the conveyance-mode changeable region, to thereby change a posture thereof between a supporting posture for supporting the glass ribbon from the lower side and a releasing posture for releasing the state of supporting the glass ribbon from the lower side, and
wherein, when a part of the glass ribbon is cut out and discarded as a discard part, under a state in which the support member is allowed to assume the releasing posture, the discard part is dropped below the conveyance-mode changeable region to be discarded.

5. The manufacturing method for a glass roll according to claim 3, wherein a downward bending amount of the glass ribbon in the second conveyance mode is maintained constant.

6. The manufacturing method for a glass roll according to claim 5, wherein, under a state in which a conveyance speed of the glass ribbon on an upstream side with respect to the conveyance-mode changeable region on the conveyance path is maintained constant, a conveyance speed of the glass ribbon on a downstream side with respect to the conveyance-mode changeable region on the conveyance path is adjusted, to thereby maintain the bending amount constant.

* * * * *